United States Patent [19]

Walters et al.

[11] 3,924,016

[45] Dec. 2, 1975

[54] COLORED AND FLAVORED COCONUT COMPOSITIONS

[75] Inventors: Larry A. Walters, Parma, Ohio; George V. Daravingas, Edina, Minn.

[73] Assignee: SCM Corporation, Cleveland, Ohio

[22] Filed: July 29, 1974

[21] Appl. No.: 492,471

Related U.S. Application Data

[63] Continuation-in-part of Ser. No. 359,484, May 11, 1973, abandoned, which is a continuation-in-part of Ser. No. 285,494, Aug. 31, 1972, abandoned.

[52] U.S. Cl. .................................. 426/540; 426/617
[51] Int. Cl.² .......................................... A23L 1/275
[58] Field of Search .......... 426/205, 207, 103, 177, 426/617, 540

[56] References Cited

UNITED STATES PATENTS

| | | | |
|---|---|---|---|
| 1,382,038 | 6/1921 | White | 426/207 |
| 2,631,104 | 3/1953 | Welker | 426/207 |

OTHER PUBLICATIONS

Lake Pigments, Warner Jenkinson Mnfg. Co., St. Louis, Mo., 1969 pp. 3, 9, 10, 13 and 21.

*Primary Examiner*—Jeanette M. Hunter
*Attorney, Agent, or Firm*—Merton H. Douthitt; S. I. Khayat

[57] ABSTRACT

Colored and flavored coconut compositions characterized by having non-bleeding and stable colors, as well as retaining the effectiveness of their flavors, are disclosed. The color and flavor retention characteristics are brought about by utilizing calcium or aluminum lake, as the coloring agent, which is incorporated into the surface of the coconut piece in substantially the form of a thin layer which, if desired, can be coated with powdered sugar.

2 Claims, 4 Drawing Figures

COLORED AND FLAVORED COCONUT COMPOSITIONS

CROSS REFERENCE TO RELATED APPLICATIONS

This application is a continuation-in-part of our copending application Ser. No. 359,484, filed May 11, 1973, now abandoned which is also a continuation-in-part of application Ser. No. 285,494, filed Aug. 31, 1972, now abandoned. These earlier applications are incorporated herein by reference.

BACKGROUND OF THE INVENTION

1. Field of the Invention

This application relates to new and improved colored and flavored coconut compositions, having stable and non-bleeding color characteristics as well as the ability to retain their flavors for long periods of time. These coconut compositions are suitable for use with a variety of bakery products, candies, and refrigerated or frozen desserts.

2. Description of the Prior Arts

Heretofore, coconut particles or pieces usually in the form of cuts (medium, macarron and flake) and shreds have been colored with various vegetable dyes which are applied generally from aqueous media due to their high solubility in water. These colored coconut particles containing these water-soluble dyes such as those disclosed in U.S. Pat. No. 1,382,038, have been known to bleed or run whenever they come in contact with moisture or surface water. Further, colors derived from most vegetable dyes fade relatively rapidly with time, providing the colored particles with short shelf life or storage. As a result, use of dye-colored coconut compositions has been limited to applications having minimum exposure to moisture or surface water.

Coconut particles have been flavored with natural and synthetic flavoring agents for some time. Generally, the amount of the flavoring agent is rather small and it is used primarily to differentiate from or enhance other flavors. The strength of the flavor in dye-colored coconut pieces appears to be related directly to time to the extent that a good portion of the flavor is lost in matters of weeks. If dye-colored and flavored coconut compositions are stored at relatively high temperatures (25° to 30°C.), then the loss of the flavors would be accelerated measurably.

The desirable sweetness associated with coconut products is contributed mostly by sweetening agents such as sugar; i.e., powdered sugar or invert sugar, and for some specific uses, a light brown (burnt) color has been imparted to some coconut compositions by coating the same with powdered sugar and toasting the coated particles.

Prior art processes for preparing colored and flavored coconut compositions consisted essentially of tumbling desiccated coconut pieces (cuts or shreds) in an aqueous solution containing a humectant, a vegetable dye colorant, and a flavoring agent until the coconut pieces absorbed the major portion of the aqueous solution. To impart the sweet taste, sugar or other sweetening agents could be dissolved in the aqueous solution or applied to the coconut pieces later by tumbling them, say, with powdered sugar. Generally, if invert sugar is used as the sweetener, the coconut composition is then dried to crystallize or fuse the sugar on the coconut pieces. To help prevent sticking and/or lumping flour or other anti-caking agents can be added.

Accordingly, the invention is directed primarily to colored and flavored coconut composition whose color is both stable and non-bleeding, and whose flavor is retained for extended periods of time, said composition being useful for decorating a variety of bakery products, candies, frozen desserts, ice creams, donuts, dairy topping, frozen custards and like applications wherein aesthetically pleasing coconut particles are subjected to moisture.

These and other advantages of this invention will become more apparent from the detailed description.

SUMMARY OF THE INVENTION

A colored and flavored coconut composition now is provided, which is characterized by having stable and non-bleeding color properties as well as retained and well maintained flavor. The newly provided coconut composition comprises a core of coconut meat having absorbed therein a water content of from about 2 percent to about 25 percent by weight, a flavorant from about traces (0.001 percent) to about 4 percent by weight, preferably from about 0.05 to 1.0 percent, and incorporated into the surface of said coconut core, in substantially the form of a thin layer, a colorant selected from an aluminum or calcium lake. Desirably, the flavored and colored coconut composition is coated with powdered sugar to impart thereto the sweet taste.

As stated hereinbefore, other sweeteners can be used such as invert sugars or artificial sweeteners by dissolving the same in an aqueous medium for incorporation into the coconut meat prior to addition of the lake.

BRIEF DESCRIPTION OF THE DRAWINGS

The accompanying drawings are photomicrophotographs of cross-sections of coconut shreds comparing those of the prior art and the present invention.

DETAILED DESCRIPTION OF THE INVENTION

Figure 1:
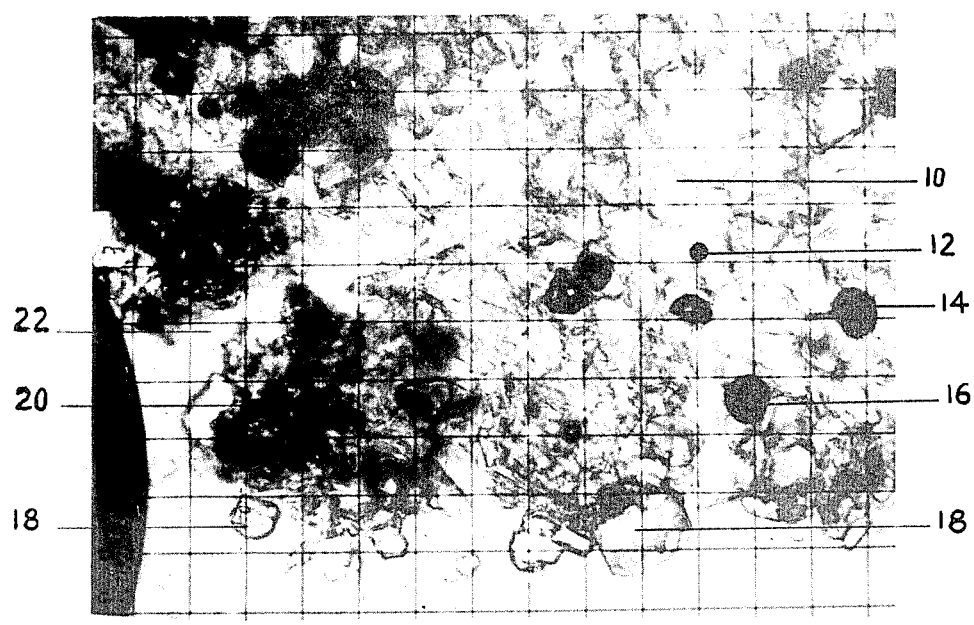

Referring now to FIG. 1 there is shown a photomicrograph of an area of cross-section of a coconut shred selected arbitrarily from a lot of red-colored, cherry-flavored coconut shred, in accordance with the invention. The coconut shred was cut with a sharp razor blade to provide as even a surface as practicable. The coconut shred contained 14 percent by weight water, 3.0 percent by weight propylene glycol as a humectant, 1.0 percent by weight cherry fruit flavor, 0.15 percent by weight red aluminum lake (FD & C No. 3), 29 percent by weight powdered sugar and the remainder coconut meat.

The photograph was taken with a 35 mm. camera (single lens reflex, exposure time = 1/15 sec.) attached to a compound microscope set at a magnification of 100X. Specifically, the hydrated coconut meat 10 shows the particular cellular structure of coconut. Dark spots 12, 14, 16, represent photographic artifacts resulting from the unevenness of the cut. Peripheral transparent bodies 18 are the sugar crystals of the powdered sugar coating. As to the red aluminum lake 20, it is shown deposited around the coconut meat 10. Actually, the lake deposits on the coconut meat surface and penetrates thereinto for a small distance.

Figure 2:
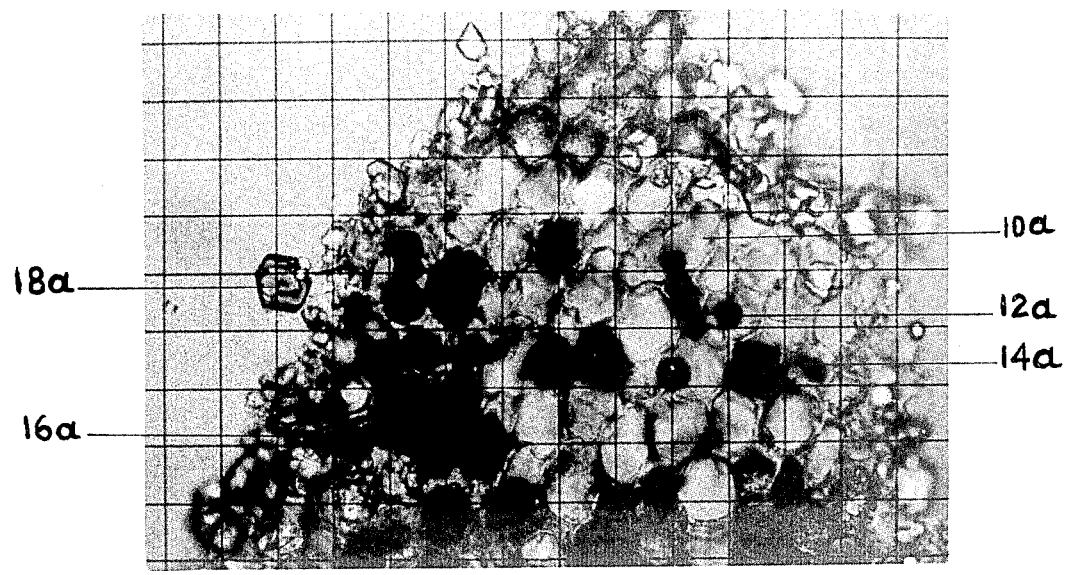

FIG. 2 is a photomicrograph of a cross-section of a coconut shred selected arbitrarily from a lot dyed with a red vegetable dye (FD & C No. 3). The composition of the coconut shred is very much the same as the one of FIG. 1 except for the amount of the coloring agent (The dye was used in the extent of 0.02 percent, whereas, the lake was 0.15 percent. The difference in weight is not due to additional coloring matter, but to the weight of the aluminum base of the lake.), and exposure time (¼ sec.). The numeral 10a represents the coconut meat and the transparent sugar crystals are given the numeral 18a. The dark bodies 12a, 14a, 16a are due to photographic artifacts as in FIG. 1. The dye color disperses throughout the coconut meat and no colored particles or layer (deposit) are observed. In this connection, it should be appreciated that the photomicrograph of FIG. 2 represents a coconut shred with all the ingredients except for the colorant.

Figure 3:
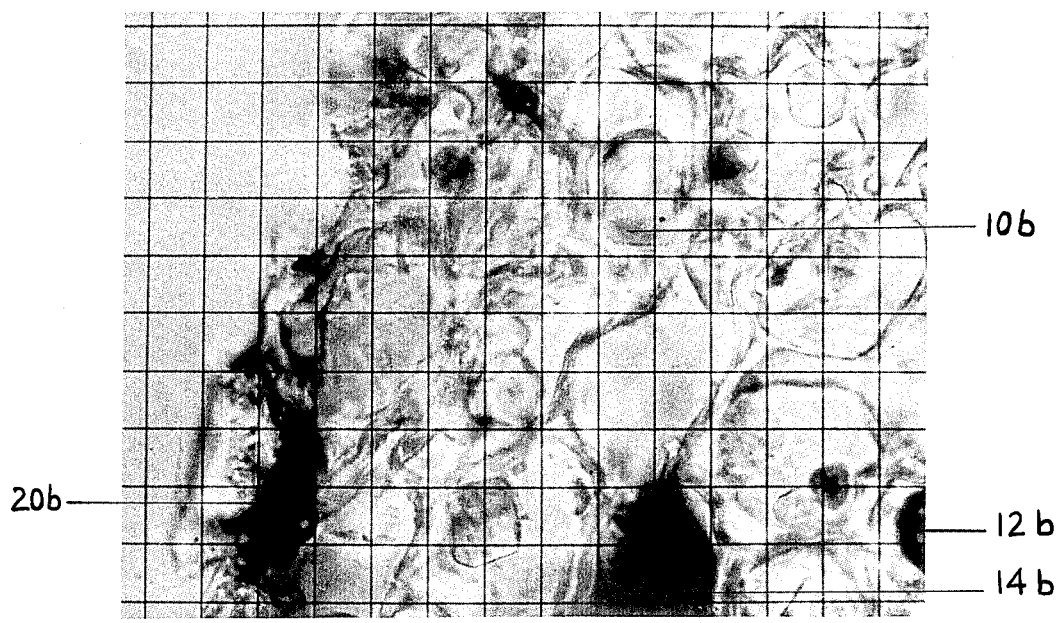

FIG. 3 is also a photomicrograph of a cross-section of a coconut shred selected arbitrarily from a lot of green colored, spearmint flavored coconut shreds in accordance with the invention. The composition was very much the same as that described for FIG. 1 except the spearmint flavor was 0.5 percent by weight. The photograph was taken with the same camera except the magnification of the microscope was set at 400X.

In this photograph the green aluminum lake 20b is shown as an almost continuous layer around coconut meat 10b. Dark spots 12b, 14b are due to the same type of artifacts described earlier.

Figure 4:
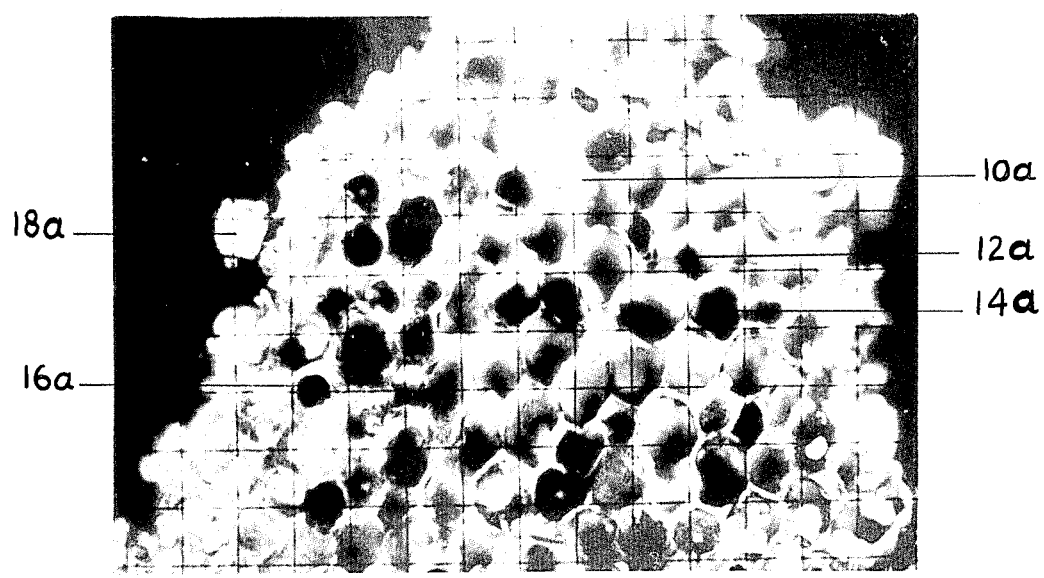

FIG. 4 is a photomicrograph of the same red colored and cherry flavored coconut shred of FIG. 2 except the light through the microscope was polarized. No other significant difference could be seen from FIG. 2. Of course, under the microscope with the indicated magnification some particles of the lake can be observed throughout the coconut meat; this is due, however, to either the very porous texture of the coconut meat or its discontinuous or fractured structure allowing the lake particles to penetrate. Such cracks and fractures 22 can be seen in FIG. 1. Most of the lake; however, deposits as a thin layer. In the case of vegetable dyes they are introduced into the desiccated or partially hydrated coconut particles with aqueous solutions. Thus, the color penetrates the coconut meat and is dispersed throughout it in the same manner as water. Generally, vegetable dyes are not applied in solid form because of difficulties in handling the usually small amounts which tend to lump and agglomerate and consequently adhere to only a small portion of the coconut particles. Obviously, uniform color dispersion is difficult to attain by such methods.

In general, coconut particles are shipped into the United States in desiccated form with the moisture content being about 3 percent or less. Prior to marketing, sufficient water is added to raise the moisture content of the coconut to fall between about 2–3 and 25 percent and preferably from about 13 to 16 percent by weight depending on the anticipated usage, be it industrial or consumer. The added moisture produces coconut particles of desirable texture and quality. To inhibit deterioration of the coconut meat at these moisture levels, a suitable humectant is added. Useful humectants are polyhydric alcohols having 3 to 6 carbon atoms as typified by propylene glycol, glycerin, and sorbitol, which are disclosed in U.S. Pat. Nos. 1,382,039 and 2,631,104.

Coconut particles are marketed in various shapes and sizes depending on the use. The present invention has been successful with all known sizes. For most industrial applications, coconut particles are used in sizes known as medium or macaroon cuts. For the former cut, it is customary that 85 percent by weight of the material is sized between Sieve No. 10 and Sieve No. 16, whereas for macaroon, the 85 percent by weight is sized between Sieve No. 16 and Sieve No. 40 (U.S. Standard Sieves Series). For consumer and home use coconut particles come in flake cut (46 percent by weight min. on No. 10 Sieve and 44 percent by weight max. on No. 20 Sieve) and short flake known as shreds (90 percent by weight between ¼ and 1 inch in length).

Aluminum and calcium lakes are well known in the art. They are classified as dyed, inorganic pigments, generally in the form of powders of fine particle size. The coloring aspects are derived from the organic dye which is rendered insoluble by precipitating or co-precipitating with the inorganic base in the form of metallic ions or suspensions. Thus the aluminum or calcium lakes of the present invention can be prepared by selecting the desired water-soluble dye (certified for use in food) and precipitating or co-precipitating the same with aluminum or calcium ions or suspensions of the corresponding oxides. Conveniently, the dye can be precipitated with a different inorganic base to form lakes of slightly different colors which can be still altered by further deposition or co-precipitation with additional metallic oxide suspensions.

Lakes certified by the United States Food and Drug Administration are suitable for practicing this invention. Representative lakes are the FD & C Green No. 1, FD & C Green No. 2, FD & C Green No. 3, FD & C Yellow No. 6, FD & C Red No. 1, FD & C Red No. 3, FD & C Red No. 4, FD & C Blue No. 1, FD & C Blue No. 2, and FD & C Violet No. 1. Preparations of these specific lakes are known in the art and they are commercially available.

The aluminum or calcium lakes can be deposited onto the coconut particles from solid powders or liquid suspensions. However, prior to the deposition of the lake, the desiccated coconut particles are hydrated, treated with a polyhydric alcohol, and a flavorant. The hydration step and the treatment with the humectant; i.e., polyhydric alcohol, are not critical to the present invention. The lake can be deposited on desiccated coconut particles having a water content of 3 percent or less as easily as the product having a water content of 20 percent or more by weight. The lake in solid form is deposited on the coconut pieces (desiccated or hydrated) by tumbling in a suitable drum or mixer. Alternatively, the lake can be deposited from a liquid suspension or dispersion which liquid can be an aqueous solution containing the humectant and flavorant. When suspension medium is desired, the lake can be dispersed effectively in the flavorant or an aqueous solution or mixture thereof, prior to applying to the coconut pieces (hydrated or desiccated).

If the flavored and colored coconut product is to be sweetened with powdered sugar it is, then, necessary that the lake be deposited on the coconut pieces prior to the addition of the powdered sugar. If the coconut pieces are coated first with powdered sugar prior to the deposition of the lake, then the latter is unable to deposit on the coconut piece evenly and thus not form the desirable thin layer to retain the flavor introduced into the coconut piece. Also, excessive lumping and caking are experienced. It is believed that the cell pores of the coconut meat or core become occupied with the sugar particles leaving little to no room for the lake particles.

In practice the aluminum or calcium lakes preferably are applied to the coconut meat, in solid form. Thus tumbling the hydrated and humectant-treated and flavored coconut particles with the requisite amount of the lake in solid form has been found very efficient. As noted earlier, however, water or liquid dispersions and suspensions can be used, if desired. The aluminum or calcium lakes deposit substantially as a thin layer around the coconut core whether applied thereto from a liquid dispersion or as the solid lake.

Colored with the aluminum or calcium lake the coconut particles can be coated with powdered sugar with relative ease such as, for example, by tumbling. However, excessive and prolonged tumbling with powdered sugar tend to cause some lumping and color non-uniformity in the final product. Thus it is important that the tumbling action with powdered sugar be limited to about five minutes. Application of the powdered sugar should be conducted after the deposition of the lake, otherwise the sugar prevents the lake from adhering to the coconut and forming the thin layer thereon. Additionally, powdered sugar added to the coconut particles prior to the incorporation of the lake tends to attract the lake's particles giving rise to a non-uniform color distribution.

As disclosed hereinbefore, the flavoring agents for use in the preparation of the colored and flavored coconut compositions of the present invention can be those utilized normally in food preparations. Thus flavor extracts from essential oils or natural and synthetic fruit flavors can be used. For example, fruit flavors such as apple, cherry, strawberry, lemon, raspberry, blueberry, citron, banana, pineapple, orange, and spice oils such as peppermint, spearmint, cinnamon, as well as other natural flavors such as chocolate, have been added. The amount of flavorant is small, often about 1 percent or less by weight. However, the addition depends on the particular flavoring agent whether being an extract or by-product of essential oil, a natural, or synthetic fruit flavor. The levels of addition of these flavors are well known in the art and can be varied as desired.

The present invention will be better understood by reference to the following examples which are provided as mere illustrations and should not be construed as limitations; all parts and percentages are by weight unless otherwise specified.

EXAMPLE I 55.35 parts of commercially available desiccated coconut (3 to 5 percent water-macaroon cut) was placed in a conventional tumblerlike food mixer to which was added 11.30 parts water and 3.70 parts propylene glycol. The contents are tumbled until the desiccated coconut particles absorbed all the liquid (water and humectant). Water content was measured at 15 percent. 0.50 part lemon oil was then added to the moisturized coconut product still in the mixer and the contents were again tumbled for effective mixing and dispersing of the flavorant. Now, 0.15 part of FD & C Yellow No. 5 aluminum lake was introduced into the mixer and the contents rotated and tumbled therein until the lake was completely dispersed onto the coconut particles. Powdered sugar was then added (29.0 parts) and the colored-flavored coconut contents were now tumbled for 3 to 5 minutes.

The resultant yellow and lemon-flavored coconut composition had a homogeneous and uniform color distribution and was free of lumps and agglomerates. When utilized with bakery or other products having surface water or high moisture content, no running or bleeding of the color was observed. The color was stable showing no fading upon exposure to sunlight or extended storage. Compared to coconut particles colored with the same yellow dye (not a lake) and flavored with lemon oil, the coconut showed considerable bleeding when it came in contact with moist objects, such as icings or toppings. Also fading on exposure to sunlight was observed with a noticeable loss of the flavor.

EXAMPLE II

The same procedure described in Example I was utilized with a number of other aluminum and calcium lakes with substantially the same excellent results. These colors were FD & C Green No. 1, FD & C Green No. 2, FD & C Green No. 3, FD & C Yellow No. 6, FD & C Red No. 1, FD & C Red No. 3, FD & C Red No. 4, FD & C Blue No. 1, FD & C Blue No. 2, FD & C Violet No. 1 and mixtures and combination thereof.

As to the amounts of the lake utilized to bring about the various colors, the matter was dependent on the intensity of the color desired as well as the colorability of the particular dye used to make the aluminum or calcium lake. Table I shows the ranges in weight percent of the various aluminum lakes used, with optimum values depending on the amount of the particular dye.

TABLE I

| FD & C Color and min. Wt. % of Lake | Ranges of Colored Alum. Lakes in Coconut Composn. | | |
|---|---|---|---|
| | Min. | Opt. | Max. |
| Green, 18% | .01 | 0.4 | 1.0 |
| Orange, 21% | .01 | 0.2 | 1.0 |
| Yellow, No. 5, 25% | .001 | 0.05 | 1.0 |
| Yellow No. 6, 19% | .001 | 0.02 | 1.0 |
| Red. No. 3, 16% | .001 | 0.15 | 1.0 |
| Brown, 25% | .01 | 1.0 | 4.0 |

EXAMPLE III

The same procedure described in Examples I and II was followed with variations in the amount of water, humectant and sweetener. These variations were as follows: desiccated coconut (various cuts and sizes) ranged between 45 and 60 percent by weight of the final colored and flavored product. The water content ranged, preferably, between about 7 and 20 percent to provide the desired texture and eating quality. Flavorants were used up to 1 percent by weight in the case of fruit flavors and about 0.5 percent for essential oil extracts.

EXAMPLE IV

The order of addition of the various ingredients was altered from the procedure described in Example I. For the sake of comparison, the yellow-colored, lemon-flavored coconut macaroon cut of Example I was designated Sample A(1) Sample A(2) was prepared by tumbling the desiccated coconut particles with powdered sugar followed by the addition of the coloring agent, the flavoring agent, and then the propylene glycol-water. The result was that the coconut particles began to form balls having wet sugar masses and was sticking to the tumbler during the preparation. Also, the color was substantially non-uniform throughout the coconut composition.

Sample A(3) was prepared by introducing propylene glycol-water mixture into the tumbler followed by the addition of desiccated coconut, sugar, color, and lemon oil, again in the same amounts as Sample A(1) The result was a substantial balling of the coconut particles and poor color distribution throughout the composition.

Sample A(4) was prepared by first adding the color and the lemon oil; then the propylene glycol-water mixture; then the desiccated coconut particles, and finally the powdered sugar. The result was a good dispersion and uniformity of color distribution; however, not all the coloring agent was absorbed by the coconut particles. To obtain the same color intensity of Sample A(1), additional lake was needed.

Data for color distribution and intensity to account for fading or stability were obtained by using known colorimetric measurements and techniques (Gardner). Flavor was generally judged by both professional and lay panels. On tasting colored and flavored coconut compositions made in accordance with the invention there appeared a definite preference to their flavors as compared with coconut compositions having the same amount of the flavorant, but colored with the water-soluble vegetable dyes. Inasmuch as tastes and detection of flavor changes are subjective in nature, the matter of flavor preference was not always unanimous by the members of the panel. What was certain, however, was that no flavor losses had been detected by the use of aluminum or calcium lakes. Thus, the flavor appeared to be retained or maintained in the colored and flavored coconut compositions of the present invention. It would seem as though the thin deposited layer of the aluminum or calcium lake operates to lock the flavor in the coconut. Of course, the layer of the lake should not be construed as though it is completely impermeable or impervious to losses of moisture or even flavor. Importantly, however, taste panel results have indicated that colored and flavored coconut compositions of the present invention had better retention of their flavor than the coconut compositions which were similarly flavored, but colored with water-soluble vegetable dyes.

The foregoing results on flavor retention were based on comparative testings by a taste panel comprising 30 lay individuals. The panel was requested to evaluate coconut samples as to odor, flavor, color, and over-all quality. The samples submitted to the panel were made of two sets of colored and flavored coconut compositions. The compositions in the first set were colored with a vegetable dye (Yellow FD & C No. 6) flavored with 0.5 percent lemon oil; whereas, the compositions in the second set were colored with aluminum lake (0.02 percent FD & C No. 6) and flavored with the same amount of lemon oil (0.50 percent). Each set was divided equally in two halves. One-half of each set (fresh) was placed in a plastic bag and sealed for subsequent evaluation and the other two halves were subjected to accelerated aging in accordance with the following procedure:

150 grams of each colored and flavored coconut composition were placed in a large container constructed similar to an aeration tube. The vessel was placed in a constant temperature bath maintained at 150°F. A stream of dry nitrogen gas was passed through the vessel to entrain and sweep away any released volatiles. This nitrogen sweep was continued for a period of 7 hours.

The panel evaluated the fresh and artificially aged sets with the results that the freshly prepared coconut compositions showed no significant differences in odor, flavor, or color between the set colored with the water-soluble dye and that colored with the aluminum lake. However, the panel showed a tendency to favor the colored and flavored coconut compositions of the present invention for over-all quality. As for the aged samples, there was a significant difference in flavor between the samples colored with the water-soluble dye and those colored with the aluminum lake indicating that the lake-colored and flavored coconut compositions of the present invention were able to retain their flavor longer than the corresponding vegetable-dye colored and flavored coconut compositions.

Comparable results to the above were obtained when the artificial aging was conducted for 4 hours at 140°F.

What we claim is:

1. In a colored and flavored coconut composition having a core of coconut meat, a water content of about 3 to about 25 percent by weight, a humectant selected from $C_{3-6}$ polyhydric alcohols, and a flavorant, the improvement for retaining the effectiveness of said flavorant which comprises: a colorant layer of aluminum lake, calcium lake, or a mixture thereof overlaying said core, said colorant constituting from about 0.01 to about 4.0 percent by weight of said composition.

2. The composition according to claim 1 which is further coated with powdered sugar.

* * * * *